Patented Oct. 28, 1952

2,615,789

UNITED STATES PATENT OFFICE 2,615,789

IRON-FREE TITANIUM ARSENATE AND PROCESS FOR MAKING SAME

Wilmer O. Davis, Reuben Roseman, and Benjamin W. Allan, Baltimore, and Ralph W. Neptune, Dundalk, Md., assignors to The Glidden Company, Cleveland, Ohio, a corporation of Ohio No Drawing. Application August 18, 1948, Serial No. 44,984

7 Claims. (Cl. 23—53)

This invention relates to substantially iron-free titanium arsenate and to a novel process for making said arsenate. The product has considerable utility as an insecticide and, as such, represents a useful addition to the group of well-known inorganic arsenicals comprising lead arsenate, calcium arsenate, etc. Another object of our invention is to furnish a new and effective anti-fouling agent. A further object is to provide a novel method for separating iron from titanium in a mixture containing both. Still further objects and uses will be apparent to those skilled in the art from the following description.

The novelty of the present invention resides in the fact that our process provides the means for obtaining substantially iron-free titanium arsenate, low in "water-soluble arsenic," from iron, titanium-containing liquors, more particularly from those liquors obtained industrially on a very large scale in the course of preparing pigmentary titanium dioxide from the well-known iron, titanium-containing mineral, ilmenite. Not only so, but the present process makes direct use of said iron, titanium-containing liquors, and, accordingly, does not involve any preliminary steps such as removing the iron from said liquors or altering its state of oxidation. The process of this invention thus represents a distinct advance in the art, and is further characterized by its simplicity, inexpensiveness and efficiency.

We have discovered that if a solution of an alkali metal arsenate, such as sodium arsenate, is added directly to a sulfuric acid solution containing bivalent iron and quadrivalent titanium (e. g., the solution derived from a sulfuric acid attack of ilmenite ore, large quantities of which are, in industry, subjected to thermal hydrolysis for the production of titanium dioxide pigment; or, the waste mother liquor after said thermal hydrolysis), first to be precipitated is titanium arsenate; furthermore, continued addition of the alkali metal arsenate results in virtually complete precipitation of the titanium at a pH below that at which ferrous arsenate begins to form without redissolving. Simple separation (by filtration, for example) and washing of the selectively precipitated titanium arsenate thus yields a product which is, practically speaking, iron-free.

In our process we usually discontinue the addition of the sodium arsenate to the ferrous-titanic liquor at a pH not substantially in excess of 1.5, inasmuch as we have found that somewhat above this point permanent precipitation of iron from acidified ferrous sulfate solutions occurs. It will be understood, however, that in the practice of our process, the point of permanent precipitation of ferrous arsenate from an iron-titanium liquor may vary according to the ratio of iron to titanium in said liquor, the concentration of sulfuric acid, the time of standing, etc.

In a particular example, given by way of illustrating our invention, but not to be construed in a limiting sense, to 100 cc. of a titanium plant liquor, analyzing

| | G./l. |
|---|---|
| TiO₂ | 263 |
| Fe (ferrous) | 83 |
| H₂SO₄ | 697 |

(Free acid, 228 g./l.; active acid, 551 g./l.)

first diluted to 263 cc. with water, were added 85 g. sodium arsenate decahydrate in the form of a solution containing 100 g. Na₃AsO₄·10H₂O per liter, with vigorous agitation, to a final pH of 1.4. The formed precipitate was filtered and the filtrate was tested for arsenic and for titanium by the hypophosphorous acid and hydrogen peroxide tests, respectively. The tests showed that the filtrate contained no arsenic and only a trace of titanium. The filter cake was washed with 2 liters of water and then was pulped in an additional quantity of water; the pulp was next heated to boiling, then filtered, after which the precipitate was washed to the point where the washings were free of sulfate and ferrous ions (as shown by the barium chloride and potassium permanganate, thiocyanate tests, respectively). The resulting cake was dried at 120° C., ground and analyzed (quantitatively) for titanium, arsenic and iron with the following results:

| | Actual Analysis | Comparative Theoretical Percentages—TiO₂:As₂O₅= 3:1 |
|---|---|---|
| | Percent | Percent |
| TiO₂ | 44.2 | 43.4 |
| As₂O₅ | 40.8 | 41.6 |
| Fe | 0.004 | |
| Water-soluble As₂O₅ | 0.46 | |
| H₂O (by difference) | 15.0 | 15.0 |

It will be seen that in this product the iron content is virtually nil, and the molecular ratio, TiO₂ : As₂O₅, is 3.12 : 1. The titanium arsenate content of the cake is thus constituted of TiO₂ and As₂O₅ in substantially the ratio which would exist in a pure titanium arsenate composed of 3 moles of $TiO_2$ to one mole of $As_2O_5$. The comparative percentages of $TiO_2$ and $As_2O_5$ of such a pure compound are indicated above. In actual practice we have found that by varying the proportions of the reactants, the ratio of $TiO_2$ to $As_2O_5$ can be varied somewhat around the theoretical value of 3 to 1. In all such products the "water-soluble arsenic" (see "Official and Tentative Methods of Analysis of the Association of Official Agricultural Chemists," sixth edition, 1945, p. 56)—the factor in the evaluation of insecticides generally believed responsible for burning of the foliage—is of a low order of magnitude.

The above example demonstrates that the process of our invention for preparing iron-free titanium arsenate (1) employs the relatively cheap and abundant iron, titanium-containing liquors—so well known in the art of producing titanium dioxide pigment—rather than costly, iron-free titanium solutions, and (2) employs said iron, titanium-containing liquors directly, without prior treatment of the liquors, such as with oxidizing agent (e. g., nitric acid) to effect the conversion of the ferrous sulfate to ferric sulfate.

Aside from providing useful insecticidal material, low in "water-soluble arsenic," as well as a new and effective anti-fouling principle for use with suitable film-forming vehicles to provide anti-fouling coating compositions, the process of the present invention will further be seen to form the basis of a new method for the chemical separation of iron from titanium, wherein is utilized, as the differential precipitant, a material (sodium arsenate) which is abundantly available as a by-product from various chemical operations. Other alkali metal arsenates may be used similarly, but sodium arsenate is presently preferred because of its abundancy as a by-product.

The process also makes it possible to recover titanium efficiently from a sulfuric acid solution which contains quadrivalent titanium, and iron, all of which iron is in the ferrous state. If the solution which is to be so treated for the recovery of titanium contains ferric iron, it may first be treated by well-known methods to reduce all of the ferric iron to the ferrous state.

In place of the process using alkali metal arsenates per se, an equivalent procedure consists in first adding arsenic acid to the sulfuric acid solution of ferrous iron and quadrivalent titanium, and then adding alkali metal hydroxide in amount sufficient to correspond to the desired alkali metal arsenate.

We claim:

1. A new composition of matter consisting essentially of titanium, arsenic and oxygen in chemical combination, wherein the titanium is in the quadrivalent state and wherein the arsenic is in the pentavalent condition, said composition having a molar ratio of essentially 3 to 1 between its titanium dioxide content and its arsenic pentoxide content, and being characterized also by exhibiting a water-soluble arsenic content below about 0.5% when calculated as $As_2O_5$.

2. A safe and effective insecticide comprising a carrier, and as its active insecticidal principle, an effective amount of a composition of matter as claimed in claim 1.

3. An anti-fouling coating composition comprising a liquid film-forming material vehicle and an effective amount of a composition of matter as claimed in claim 1.

4. The method of effecting the preparation and separation of an essentially iron-free titanium arsenate of low water-soluble arsenic content from an aqueous sulfuric acid solution composed essentially of quadrivalent titanium sulfate and iron sulfates, which comprises: reducing any ferric iron in said solution to the ferrous state; then selectively precipitating the quadrivalent titanium in the form of a titanium arsenate having a molar ratio of essentially 3 to 1 between its titanium dioxide content and its arsenic pentoxide content, by adding sodium arsenate to the solution until at least a substantial part of the titanium has been precipitated and discontinuing the addition of sodium arsenate before any permanent precipitation of ferrous iron occurs; then recovering the formed titanium arsenate precipitate and washing it until substantially free of ferrous ions.

5. The process as claimed in claim 4 wherein the addition of sodium arsenate is discontinued before the pH of the solution rises above about 1.5.

6. The process as claimed in claim 5 wherein the sodium arsenate employed therein is formed in situ by first adding arsenic acid to the solution and then adding substantially a chemically equivalent amount of sodium hydroxide.

7. A process for separating quadrivalent titanium in sulfuric acid solution from iron sulfates contained in said solution, which comprises reducing any ferric ions in said solution to the ferrous state and then selectively precipitating at least a substantial part of the quadrivalent titanium as a titanium arsenate composed essentially of quadrivalent titanium, oxygen and pentavalent arsenic in substantially the proportions represented in the formula $3TiO_2 \cdot As_2O_5$.

WILMER O. DAVIS.
REUBEN ROSEMAN.
BENJAMIN W. ALLAN.
RALPH W. NEPTUNE.

REFERENCES CITED

The following references are of record in the file of this patent:

UNITED STATES PATENTS

| Number | Name | Date |
|---|---|---|
| 1,196,031 | Rossi | Aug. 29, 1916 |
| 1,356,569 | Thum et al. | Oct. 26, 1920 |
| 1,932,087 | Richter | Oct. 24, 1933 |
| 1,996,089 | Thompson | Apr. 2, 1935 |
| 2,105,459 | Kinzie et al. | Jan. 11, 1938 |
| 2,113,946 | Plechner et al. | Apr. 12, 1938 |
| 2,345,985 | McKinney | Apr. 4, 1944 |

FOREIGN PATENTS

| Number | Country | Date |
|---|---|---|
| 116,166 | Austria | Feb. 10, 1930 |

OTHER REFERENCES

Comey and Hahn, "A Dictionary of Chemical Solubilities," 2nd Ed., page 69, McMillan Co., N. Y. C., 1921.

Mellor, "Comprehensive Treatise on Inorganic and Theoretical Chemistry," vol. 9, page 188. Longmans, Green and Co., N. Y. C., 1929.